United States Patent [19]
Mack

[11] 3,745,476
[45] July 10, 1973

[54] LIGHT AMPLIFICATION USING ABSORBING MEDIUM

[75] Inventor: Michael E. Mack, Vernon, Conn.

[73] Assignee: United Aircraft Corporation, East Hartford, Conn.

[22] Filed: Apr. 8, 1971

[21] Appl. No.: 132,532

Related U.S. Application Data

[63] Continuation of Ser. No. 792,680, Jan. 21, 1969, abandoned.

[52] U.S. Cl............... 330/4.3, 332/7.51, 350/160, 307/88.3
[51] Int. Cl............................................. H01s 3/10
[58] Field of Search.................... 332/7.51; 330/4.3; 350/160; 307/88.3

[56] References Cited
UNITED STATES PATENTS
3,389,269  6/1968  Giordmaine et al............... 307/88.3
3,390,278  6/1968  Giordmaine et al............... 307/88.3

OTHER PUBLICATIONS
Rentzepis et al., "Coherent Optical Mixing... Liquids," 5/2/66, pg. 792–794, Phys. Rev. Letters, Vol. 16, No. 18.

Corman et al., "Observation of Degenerate ... Amplification," 12/26/66, pg. 1281–1283, Phys. Rev. Letter, Vol. 17, No. 26.

Bass et al., "Broad Band Light Amplification in Organic Dyes," 8/11/67, pg. 89–91, Applied Phys. Letters, Vol. 11, No. 3.

Primary Examiner—Benjamin A. Borchelt
Assistant Examiner—N. Moskowitz
Attorney—Donald F. Bradley

[57] ABSTRACT

An absorbing medium under the influence of a sufficiently intense light beam from a laser will amplify a weaker light beam simultaneously incident on the absorbing medium. If the two beams make a small angle with each other, a third light beam is produced. Optical coincident logic may be performed with the light beams.

5 Claims, 10 Drawing Figures

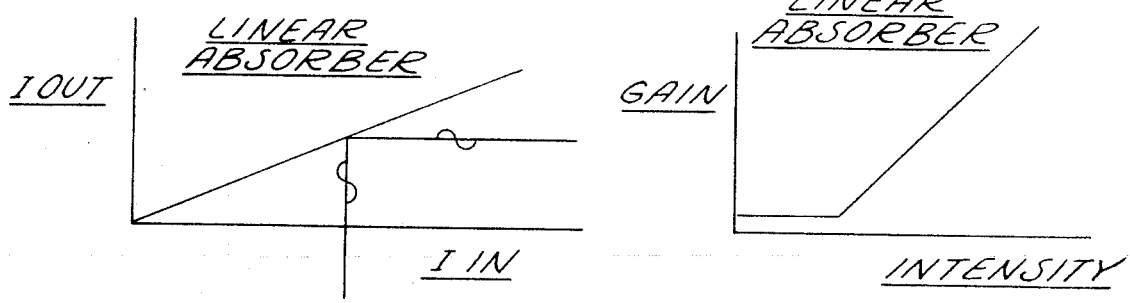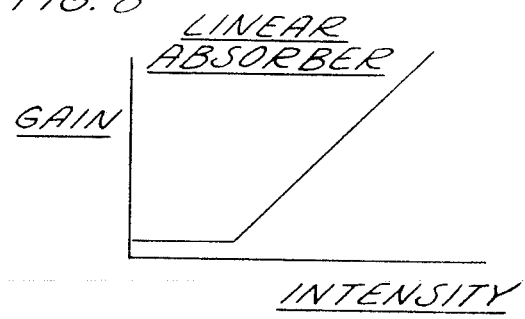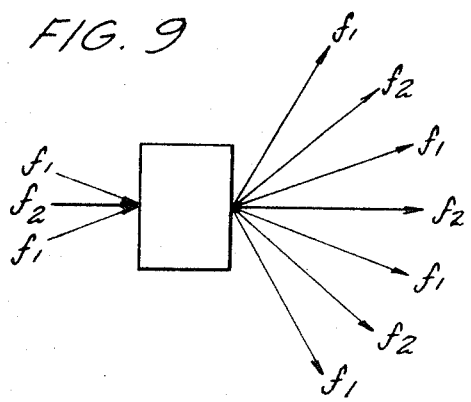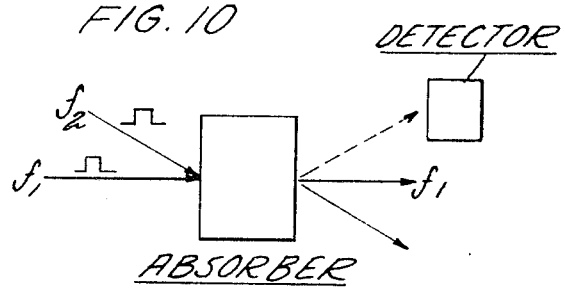

LIGHT AMPLIFICATION USING ABSORBING MEDIUM

The present application is a continuation of application Ser. No. 792,680, filed Jan. 21, 1969, and now abandoned.

BACKGROUND OF THE INVENTION

1. Field of the Invention

This invention relates to light amplification by means of an absorbing medium. Specifically, if two light beams such as laser beams are simultaneously incident on an absorbing medium at a small angle, and one of the light beams is intense and the other is relatively weak, the weaker beam will be amplified. Further, under specified conditions a third beam is produced. The absorbing medium must be absorbing at the frequency of the strong beam, and for saturable absorbers the strong beam must be of sufficient intensity to appreciably change the distribution of population among the absorbing levels. For linear absorbers the incident intensity must exceed a certain threshold, which varies with the solvent used. The intensity of the weak beam must be small compared to that of the strong beam, and its frequency must not differ from that of the strong beam by more than the homogeneous line width of the absorbing transition.

The effects described take place in both saturable and linear absorbers. In addition, if two beams of different frequencies coincidentally intersect a saturable absorber colinearly rather than at an angle, the output beam intensity modulation is enhanced.

For certain specified conditions other optical sideband frequencies and additional light beams are produced.

2. Description of the Prior Art

Absorbing media such as saturable absorbers are commonly used in the optical feedback cavity of lasers such as ruby to mode or phase lock the output from the laser. These absorbers normally take the form of liquid dyes which are mixed with a solvent in an optical cell.

However, it has not been previously known that an absorbing medium can be used outside a laser feedback cavity to amplify a light beam incident thereon, or to perform optical logic.

SUMMARY OF THE INVENTION

A primary object of the present invention is to provide light amplification by means of an absorbing medium.

In accordance with the present invention, two laser beams of identical or nearly identical frequencies are simultaneously incident on a cell containing an absorbing medium at a small angle to each other. One of the beams is of much higher intensity than the other. The less intense beam is amplified at the expense of the more intense beam.

In accordance with a further aspect of the present invention, at certain specified angles between the two beams, a third beam is generated within the cell containing the absorber, and optical logic may be performed.

Other modifications of the invention such as the modulation of two collinear beams, the generation of a plurality of output beams and the incidence of a plurality of input beams in both saturable and linear absorbers, will be enumerated in the following description.

BRIEF DESCRIPTION OF THE DRAWINGS

FIG. 7 shows graphically the transfer function for a linear absorber.

FIG. 8 shows graphically the gain of a linear absorber as a function of light beam intensity.

FIG. 9 shows schematically a different amplifier arrangement for linear absorbers.

FIG. 10 shows schematically an arrangement for performing optical logic.

DESCRIPTION OF THE PREFERRED EMBODIMENT

The initial portion of the following description will relate exclusively to saturable absorbers, and the latter portion to linear absorbers.

Figure 1:
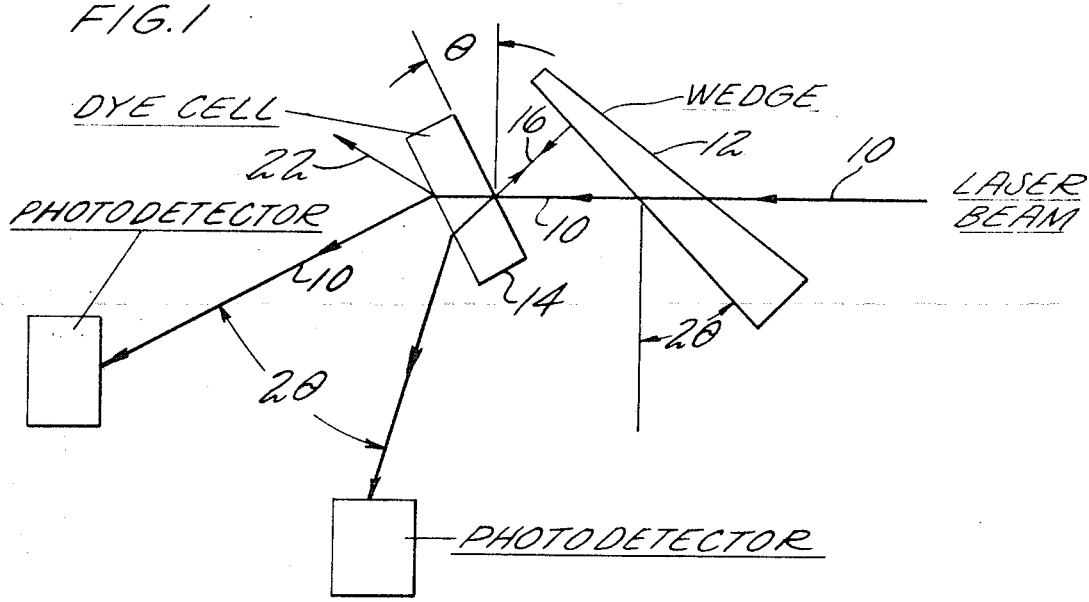
FIG. 1 is a schematic diagram of apparatus for producing light amplification.

Referring to FIG. 1 there is shown schematically an apparatus which generates a strong laser beam and a weak laser beam and which are both incident on a dye cell containing a saturable absorber.

A source of laser light such as a ruby laser (not shown) generates a beam of light 10 which is transmitted through an inclined glass wedge 12 and impinges on a dye cell 14 canted at a slight angle $\theta$ relative to the light beam 10. The dye cell 14 is filled with a saturable absorber such as cryptocyanine in a methanol solution.

Most of the light beam 10 passes through the dye cell 14, but a small amount is reflected by it, striking the inclined wedge 12. Part of the reflected beam is itself reflected back along the same path 16 by the surface of the wedge. The net result is that two beams pass through the dye; the first, an intense light beam 10, and the second a much weaker beam 16 inclined to the first beam by an angle $2\theta$ and delayed in time from the first by an amount of approximately $2S/C$ where S is the spacing between the dye cell 14 and wedge 12, and C is the speed of light. A wedge is used to avoid spurious reflection.

The light beam will be described as being pulsed such as from a mode-locked laser, but the beam may also be CW. The intensity of the pulses must be adjusted so that the pulses in beam 10 will saturate the dye, while the delayed pulses in beam 16 will not. The weak delayed beam could equally well be an optical signal derived by some other means.

If the intensity of the two emerging beams is monitored such as by photodetectors 18 and 20, it is found that the delayed beam 16 is amplified and the main beam 10 is attenuated, and the more the delayed beam is amplified, the more the main beam is attenuated. Further, a weaker third beam 22 appears on the opposite side of the main beam.

The gain in the delayed beam 16 varies as a function of delay time between the main beam 10 and delayed beam 16, and in the pulsed mode gain occurs only when there is an appreciable overlap of the pulses in the delayed beam with those in the main beam. The gain decreases rapidly as the delay is increased beyond the pulse duration. In other words, in the pulsed mode there is gain only when the delay is comparable to or less than the pulse duration.

The amount of gain is also dependent on the concentration of the dye. For example with cryptocyanine in a methanol solution, the gain will vary from a factor of 2 or 3 in an optical density 0.3 solution to a factor of 10 to 20 in an optical density 10.0 solution.

The generation of the third beam 22 in the amplification process is dependent on the angular separation $\theta$ between the main beam 10 and the delayed beam 16. For large angular separations, $\theta \geq 20$ milliradians, the third beam is not produced. An appreciable third beam is produced at small angles, $\theta \leq 10$ not much gain is produced, and no third beam, at $\theta \geq 50$ milliradians. As $\theta$ increases, the gain decreases. The gain is limited by the phase matching between the two incident beam fronts. At $\theta \cong 7$ milliradians the energy in the third beam is about equal to the energy in the amplified delayed beam 16.

Figure 2:
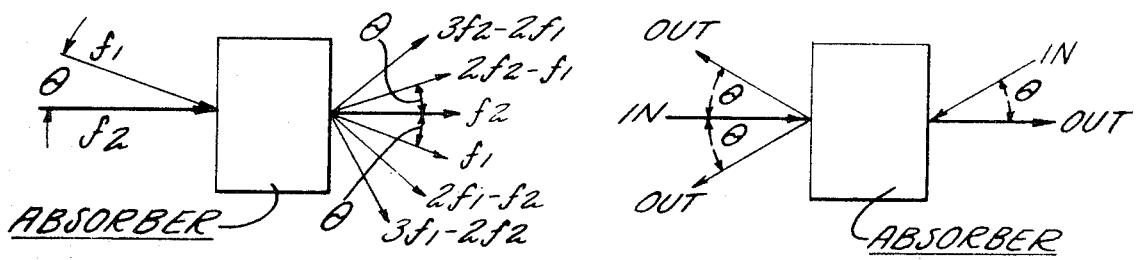
FIG. 2 shows schematically a saturable absorber amplifier.

The frequency of the third beam will be a harmonic of the two incident beams. In addition to the third beam, other beams of lower intensities and other harmonic contents are produced. In FIG. 2 two laser beams, either pulses or CW, are shown incident on a cell containing a saturable absorber, the main beam having an optical frequency $f_2$ and the second beam having an optical frequency $f_1$. The two beams are coincident in time, or overlap appreciably, and are separated by an angle $\theta$ of 10 milliradians or less. The output beams appear as main beam of frequency $f_2$ lower in intensity and second beam of frequency $f_1$ amplified in intensity as described previously. Also appearing at the output is the third beam at frequency $2f_2-f_1$, and other harmonics of frequencies $3f_2-2f_1$, $2f_1-f_2$, $3f_1-2f_2$, etc. as shown, each beam being separated from the adjacent beam by $\theta$. The intensity of the harmonic beams decrease in intensity with distance from the main beam.

Figure 3:
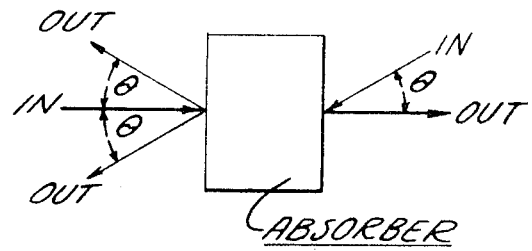
FIG. 3 shows schematically a different saturable absorber amplifier.

The angle $\theta$ between the two incident beams may appear in other quadrants, i.e., to produce amplification and a third beam as described above $\theta$ may occur as $180°\pm\theta$. As shown in FIG. 3, the two input beams are separated by almost 180°, and at least three output beams are produced, the third beam occurring at an angle $\theta$ from the main beam input.

Figure 4:
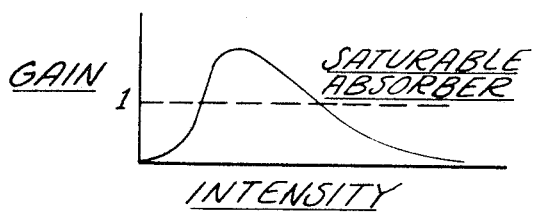
FIG. 4 shows graphically the gain of a saturable absorber as a function of light beam intensity.

FIG. 4 shows the gain of a saturable absorber dye as a function of the intensity of the incident beam or beams. The gain peaks at a predetermined light intensity and falls off when the intensity is exceeded. The maximum gain coefficient is equal to one fourth of the low level loss coefficient of the absorbing medium. For example, if the low level light transmission is 1 percent $(e^{-5})$, then the power gain for a weak wave is $\geq e^{+}(5/4)$ or 350 percent.

Figure 5:
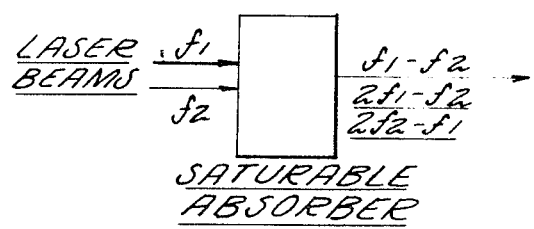
FIG. 5 is a schematic diagram of a saturable absorber beam modulator.
Figure 6:
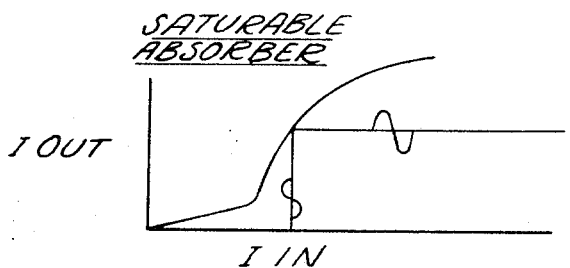
FIG. 6 shows graphically the transfer function for a saturable absorber.

FIG. 5 shows a special case of the above-described phenomenon. In FIG. 5 the two input light beams, a main beam of frequency $f_1$ and a secondary beam of frequency $f_2$, are collinear and coincident on a saturable absorber. The intensity in the saturable absorber is then amplitude modulated at the difference frequency, $f_1-f_2$. As long as the dye can respond to the modulation, the non-linear absorption of the dye will enhance and distort the modulation, and other frequency sidebands are generated. The enhancement of the modulation arises because or reduced attenuation in the sidebands relative to the center frequency. Whether this becomes actual gain depends on the shape of the saturable absorber curve shown in FIG. 6, at the operating point and on the absorpiton at that point. In FIG. 6 the modulation occurs at a non-linear portion of the intensity-in vs intensity-out curve, and the output modulation is slightly distorted in amplitude. Thus the output beam produces gain in the secondary frequency $f_2$ at the expense of the main beam frequency $f_1$, and the output beam contains all the harmonics as though the two input beams were at an angle $\theta$.

FIG. 6 also shows the typical characteristics of saturable or non-linear absorbers, namely, that the attenuation decreases with increasing light beam intensity.

In all the described embodiments the difference in frequency between the main and secondary input beams must be within the power broadened linewidth of the particular saturable absorber.

Gain occurs in all other saturable absorbers of the class including cryptocyanine, and further includes acetone, methanol and dimethyl sulfoxide solutions of cryptocyanine, dicyanine A and 1,1'-diethyl-2,2'-dicarbocyanine iodide. Chloro-aluminum phthalocyanine in ethanol also exhibits gain. All saturable absorbers exhibit this effect.

For maximum effect in the above-described apparatus the incident light beams should be coherent, and laser beams are preferred, although non-coherent beams may be used in certain circumstances.

In explaining the physical basis of the phenomenon, the great similarity between the angular dependence of the phenomenon and that predicted for light-by-light scattering experiments suggests that a non-linearity in the refractive index is responsible for the gain. However, the effect does not occur without a dye present, thus making this explanation unlikely. Another possible explanation for the gain is the presence of coherency effects, but the fact that the gain vanishes when the two input pulses are separated in time eliminates this possibility.

The fact that gain occurs in all saturable dyes indicates strongly that the effect is interrelated with the saturation itself, and the better explanation appears to be that the effect is an amplitude grating effect caused by a change in absorption produced by the input beams.

To summarize the theory of saturable absorber action as disclosed, consider the case of two plane monochromatic waves, one of much lower intensity than the other and of slightly different frequency, incident upon the medium. Assume also that the absorption of the dye solution decreases with increasing incident beam intensity. Because of the slight difference in frequency, the intensity within the absorbing medium is modulated at the beat frequency of the two waves. The degree of modulation in the transmitted beam is enhanced over that in the incident beam because of the non-linear absorption in the medium. This is equivalent to saying that the weaker beam is amplified. The degree of amplification is dependent on the slope of the attenuation vs intensity curve for the dye solution at the intensity being used. Because the modulation in the transmitted beam is no longer sinusoidal, the process also results in the generation of harmonics. In the event that the two incident beams are not collinear, the various frequency harmonics will be generated in different directions.

Many of the effects described previously occur in linear absorbers as well as saturable absorbers. The following description will relate to linear absorbers. A linear absorber has a transfer function which is linear with the incident light beam intensity as shown in FIG. 7. In linear absorbers the gain appears to be more a function of the solvent or liquid, and less a function of the particular dye, than in saturable absorbers. Some glasses also produce the effect.

In general, the light scattering observed in the absorbing liquids and glasses is due to refractive index changes brought about by optically induced temperature waves rather than by density waves as in prior thermal scattering effects.

The apparatus used to produce the effects in linear absorbers is the same as is shown in FIGS. 1 and 2 except that a linear absorbing material is substituted for the saturable absorbing material. Two light beams are simultaneously incident upon the absorber, one a very intense beam of about 5 $Gw/cm^2$, and a weaker one of about .5 $Mw/cm^2$. The two beams make a small angle, $\theta$, with each other. Either pulsed beams or CW beams may be used. In the embodiments described both beams are assumed to be derived from the output of a mode-locked ruby laser which produces a train of 2 picosecond pulses.

As in the previous effect, the weaker beam is amplified at the expense of the stronger beam, and a number of higher order beams are also generated. Up to nine generated beams have been observed using quinoline as the liquid absorber. Only water shows little or no effect regardless of the absorber used. The magnitude of the effect appears characteristic of the liquid rather than the dye. With non-absorbing materials only the stronger beam is seen at the output.

The gain vs intensity curve for a linear absorber is shown in FIG. 8. With presently available laser sources power gains of 10 to 100 times are possible.

The patterns of the output beams resemble diffraction by a transmission grating, and can be understood on this basis. An intensity dependence in either the absorption or the refractive index will lead to a grating with such an orientation and periodicity as to scatter the strong beam in the direction of the weak beam and in the direction of the first generated beam. The increased intensity in these directions would, if the phasing is correct, lead to a further enhancement of the grating which would in turn further increase the scattering. The higher order beams represent higher order diffraction from the grating structure.

The fact that the absorptivities of the solutions are intensity independent indicates that a phase grating is developed in this embodiment rather than an amplitude grating. The fact that the pure liquid shows no gain while the gain in the absorbing solution is characteristic of the solvent indicates that the absorbing dye transfers an excitation to the liquid which in turn affects its refractive index. Eventually this excitation will take the form of a density wave. However, it must be concluded that the transferred internal excitation in the solvent is, itself, responsible for the change in refractive index, and roughly speaking may be regarded as a change in the internal temperature of the solvent molecules.

FIG. 9 shows another modification of the light amplification devices, that is, that more than two input beams can be used. This embodiment applies to both saturable and linear absorbers. As previously, the weaker beams will be amplified at the expense fo the stronger ones.

FIG. 10 shows how the devices described may be used to perform optical coincident logic. If the two input beams are pulses, they must occur simultaneously to produce a third output beam. If a detector is placed to sense the occurrence of a third beam, the device operates as an AND circuit, an output from the detector only occurring when both input pulses occur coincidentally. If both inputs are CW waves, both must occur before a third beam appears. Other modifications and other logic circuits will be apparent to those skilled in the art.

It is to be understood that the invention is not limited to the specific embodiment herein illustrated and described but may be used in other ways without departure from its spirit as defined by the following claims.

I claim:

1. Amplification apparatus for an optical beam comprising
   first and second optical beams, said first beam having a much higher intensity than said second beam, said beams being of substantially identical wavelengths,
   and a transparent linear absorbing medium which is absorbing within a band encompassing the wavelengths of said first and second optical beams, said first and second beams being simultaneously incident on said absorbing medium at a small angle to each other, said first beam having an intensity sufficiently high to saturate said absorbing medium,
   said beams passing through said absorbing medium where said second beam is amplified while said first beam is attenuated.

2. Amplification apparatus as in claim 1 in which said first and second optical beams are pulsed beams and said pulses are simultaneously incident with said absorbing medium.

3. Amplification apparatus as in claim 1 in which said first and second beams intersect said absorbing medium at an angle of 10 milliradians or less relative to each other, additional optical beams being produced and emanating from said absorbing medium.

4. Amplification apparatus as in claim 3 in which said first and second beams are of different optical frequencies, and in which said additional optical beams are at optical frequencies which are harmonics of said first and second beams.

5. An optical coincident logic apparatus comprising
   an optical absorbing medium,
   a first optical beam of high intensity,
   a second optical beam of low intensity,
   said first and second optical beams intersecting said absorbing medium at a small angle to each other, coincidence of said first and second beams producing a plurality of additional beams which emanate from said absorbing medium,
   and a photodetector positioned in the path of one of said additional beams and producing an output signal only when said additional beams occur.

* * * * *